WILLIAM B. TOWNES.
Improvement in Combined Corn and Cotton Planters.
No. 114,625. Patented May 9, 1871.

UNITED STATES PATENT OFFICE.

WILLIAM B. TOWNES, OF GRENADA, MISSISSIPPI.

Letters Patent No. 114,625, dated May 9, 1871.

IMPROVEMENT IN COMBINED CORN AND COTTON-PLANTERS.

The Schedule referred to in these Letters Patent and making part of the same.

*To all whom it may concern:*

Be it known that I, WILLIAM B. TOWNES, of Grenada, in the county of Grenada and State of Mississippi, have invented a new and improved Combined Corn and Cotton-Planter and Fertilizer-Distributer; and I do hereby declare that the following is a full, clear, and exact description of the same, reference being had to the accompanying drawing forming a part of this specification, in which—

Figure 1:
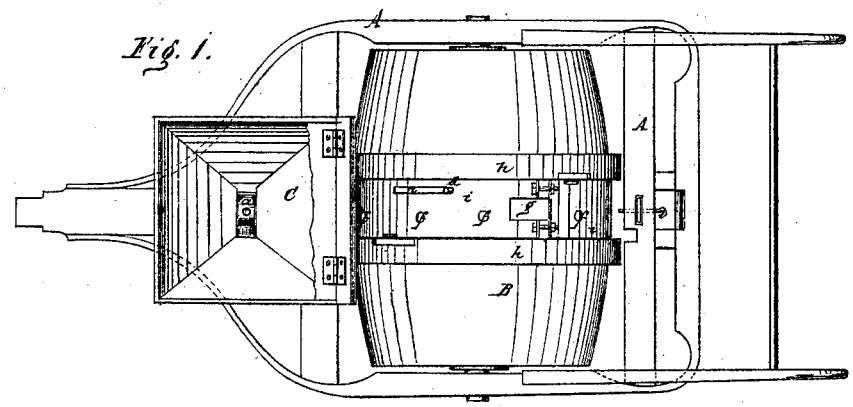
Figure 1 is a plan view.
Figure 2:
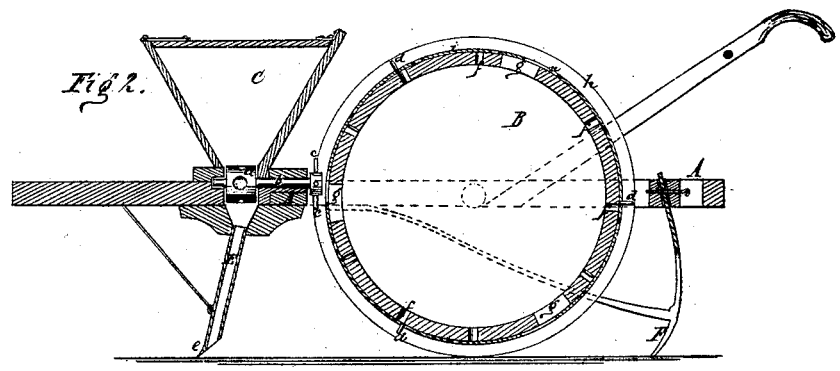
Figure 2 is a sectional elevation.

This invention relates to the combination in one machine of a corn-planter, a cotton-planter, and a fertilizer-distributer, the former being operated by the rotation of the latter, and the said distributer being so contrived as to enable the fertilizer to be dropped in hills or in an almost continuous drill, and in greater or lesser quantities, as may be desired.

Referring to the drawing—

A is the frame of the machine, the same being mounted on trunnions that extend from the ends of a drum, B, which contains the fertilizer, and also answers instead of supporting-wheels.

On the frame in front of the drum B is secured a seed-box, C, of hopper shape, in the open lower mouth of which is placed an ordinary cylindrical dropper, $a$, having the usual pockets in its periphery to receive the grain and drop it as the cylinder revolves.

The shaft $b$ of the dropper extends backward to a point so near the drum B that the radial arms $c$, which extend from the dropper-shaft in a plane parallel with the axis of the drum, are struck one after another by pins, $d$, that extend from the periphery of the drum in a plane at right angles to that of the axis.

The striking of the arms $c$ by the pins $d$ causes the dropper-shaft to rotate.

The seed-tube E is provided with a shovel, $e$, at its front side and lower end, for the purpose of forming furrows, into which the seed may fall.

A row of round holes, $f$, is made in the shell of the drum, all in the vertical plane that bisects the same, and between certain of the holes $f$ are made larger square or oblong holes, $g$.

Parallel circumferential ribs, $h\ h$, stand out from the exterior of the drum, one at each side of the row of holes $f\ g$, said ribs being of the same height as the pins $d$, which are located between and protected by them.

Between the said ribs is also located a band, $i$, closely encircling the drum, in which band are made perforations of the same size and shape as the perforations $f\ g$ of the drum, and placed at such intervals that, by sufficiently turning the band on the drum by means of handles $m$, projecting from the band, the latter may be set so as to uncover the square holes $g$, closing the round ones, or so as to open all the round holes, together with a limited portion of each square one, or so as to close both the round and square holes. The square holes alone are to be opened when it is desired to drop the fertilizer in hills at suitable intervals; the round holes and parts of the square ones, when it is desired to scatter the fertilizer in an almost continuous drill; and all the holes are to be closed when the machine is *en route* from one place of dropping to another.

The pins $d$ project through slots $n$ cut in the band, to enable it to turn past the pins.

In practice I propose encircling the band $i$ with a supplementary band, the office of which will be to diminish the capacity of the holes $f\ g$ whenever this is desired, as when fine manures are used, or in planting cotton, by sliding sidewise, so as to cover a greater or lesser portion of all the holes.

F is a board secured to the frame in rear of the drum for the purpose of covering the seed.

Having thus described my invention,

What I claim as new, and desire to secure by Letters Patent, is—

The arrangement of the seed-box C, dropper $a$, shaft $b$, pins $c$, drum B, and pins $d$, as specified.

WILLIAM B. TOWNES.

Witnesses:
   J. B. McKENZIE,
   LAWRENCE RILEY.